US012401244B2

(12) United States Patent
Sakurada et al.

(10) Patent No.: US 12,401,244 B2
(45) Date of Patent: Aug. 26, 2025

(54) ELECTRIC MOTOR

(71) Applicant: Mitsubishi Electric Corporation, Tokyo (JP)

(72) Inventors: Tetsuya Sakurada, Tokyo (JP); Kazuki Iwasa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 301 days.

(21) Appl. No.: 18/040,430

(22) PCT Filed: Sep. 25, 2020

(86) PCT No.: PCT/JP2020/036189
§ 371 (c)(1),
(2) Date: Feb. 3, 2023

(87) PCT Pub. No.: WO2022/064627
PCT Pub. Date: Mar. 31, 2022

(65) Prior Publication Data
US 2023/0291261 A1    Sep. 14, 2023

(51) Int. Cl.
H02K 1/32    (2006.01)
H02K 9/06    (2006.01)

(52) U.S. Cl.
CPC .................. H02K 1/32 (2013.01); H02K 9/06 (2013.01)

(58) Field of Classification Search
CPC ............ H02K 1/32; H02K 5/207; H02K 9/06; H02K 5/15
See application file for complete search history.

(56) References Cited

U.S. PATENT DOCUMENTS 5,889,342 A * 3/1999 Hasebe .................... H02K 9/19
310/156.19
2012/0248920 A1* 10/2012 Takahashi ................ H02K 1/32
29/598
(Continued)

FOREIGN PATENT DOCUMENTS

JP    H06105492 A    4/1994
JP    H06048355 U    6/1994
(Continued)

OTHER PUBLICATIONS

Translation of JP2011223803A (Year: 2011).*
(Continued)

Primary Examiner — Terrance L Kenerly
Assistant Examiner — Theodore L Perkins
(74) Attorney, Agent, or Firm — BUCHANAN, INGERSOLL & ROONEY PC

(57) ABSTRACT

An electric motor includes a shaft supported rotatably around a rotation axis, a rotor rotatable integrally with the shaft, a stator, and first and second retaining members to hold the rotor therebetween in an extending direction of the rotation axis. The rotor includes a stack of thin plates arranged in the extending direction of the rotation axis and including identically-shaped through holes. The through holes define air passages penetrating the rotor in the extending direction of the rotation axis. The first and second retaining members respectively include first and second through holes in communication with the air passages. The radially outermost portions of the walls of the first through holes are located radially inward from the radially outermost portions of the walls of the second through holes.

9 Claims, 16 Drawing Sheets

(56) References Cited

U.S. PATENT DOCUMENTS

| | | | | |
|---|---|---|---|---|
| 2014/0265667 A1* | 9/2014 | Boxberg | ............... | H02K 5/207 310/59 |
| 2019/0288588 A1 | 9/2019 | Sato et al. | | |

FOREIGN PATENT DOCUMENTS

| | | | | |
|---|---|---|---|---|
| JP | H08275474 A | | 10/1996 | |
| JP | 2011223803 A | * | 11/2011 | |
| JP | 2017208965 A | | 11/2017 | |
| WO | WO-2018173104 A1 | * | 9/2018 | ............. H02K 1/276 |

OTHER PUBLICATIONS

Translation of WO2018173104A1 (Year: 2018).*
International Search Report (PCT/ISA/210) with translation and Written Opinion (PCT/ISA/237) mailed on Nov. 24, 2020, by the Japan Patent Office as the International Searching Authority for International Application No. PCT/JP2020/036189. (9 pages).
Notice of Reasons for Refusal with translation issued on Jan. 31, 2023 by the Japan Patent Office in corresponding Japanese Patent Application No. 2022-551511. (9 pages).

* cited by examiner

ELECTRIC MOTOR

TECHNICAL FIELD

The present disclosure relates to an electric motor.

BACKGROUND ART

Some electric motors each include a fan fixed to a shaft and rotatable integrally with the shaft, in order to cool components of the electric motor. In this electric motor, the rotation of the fan causes air outside the electric motor to enter the electric motor and flow through air passages of a rotor core and a gap between a stator core and the rotor core, for example. This air flow cools components of the electric motor, such as a stator core, a stator conductor, a rotor core, and a rotor conductor. A typical example of this type of electric motor is disclosed in Patent Literature 1. In the electric motor disclosed in Patent Literature 1, the air introduced into the electric motor by means of rotation of a fan flows through openings of core retainers and wind holes of a rotor core and then exits the electric motor. This configuration can cool a stator core, a stator conductor, the rotor core, and a rotor conductor.

CITATION LIST

Patent Literature

Patent Literature 1: Unexamined Japanese Utility Model Application Publication No. H6-48355

SUMMARY OF INVENTION

Technical Problem

The openings and the wind hole of the electric motor disclosed in Patent Literature 1 extend in a direction intersecting the rotation axis. The rotor core including the wind hole having this shape requires a complicated fabrication process that involves bonding a large number of thin metal plates in which through holes having the identical shape are disposed at mutually different positions, or boring the rotor core with a machine.

An objective of the present disclosure, which has been accomplished in view of the above situations, is to provide an electric motor that has high cooling efficiency and can be fabricated by a simple process.

Solution to Problem

In order to achieve the above objective, an electric motor according to an aspect of the present disclosure includes a shaft, a rotor, a stator, a first retaining member, and a second retaining member. The shaft is supported rotatably around a rotation axis. The rotor is located radially outward from the shaft and rotatable integrally with the shaft. The stator is radially opposing the rotor to define a space. The first retaining member and the second retaining member hold the rotor therebetween in the extending direction of the rotation axis. The rotor includes a stack of thin plates arranged in the extending direction of the rotation axis and including through holes having the identical shape. The through holes of the individual thin plates included in the stack define air passages extending through the rotor in the extending direction of the rotation axis. The first retaining member includes first through holes in communication with the upstream ends of the air passages. The second retaining member includes second through holes in communication with the downstream ends of the air passages. The radially outermost portion of the wall of each of the first through holes is located radially inward from the radially outermost portion of the wall of each of the second through holes.

Advantageous Effects of Invention

The rotor included in the electric motor according to an aspect of the present disclosure includes the air passages extending through the rotor in the extending direction of the rotation axis, and the first retaining member and the second retaining member holding the rotor therebetween in the extending direction of the rotation axis includes the first through holes and the second through holes, respectively. The radially outermost portion of the wall of each of the first through holes is located radially inward from the radially outermost portion of the wall of each of the second through holes. Accordingly, the air at the openings of the second through holes has a static pressure lower than that of the air at the openings of the first through holes during rotation of the rotor. This configuration facilitates the air to flow through the first through holes into the air passages, thereby improving the cooling efficiency. The electric motor, of which the rotor is made of a stack of thin plates including through holes having the identical shape, can be fabricated by a simple process.

DESCRIPTION OF EMBODIMENTS

Figure 1:
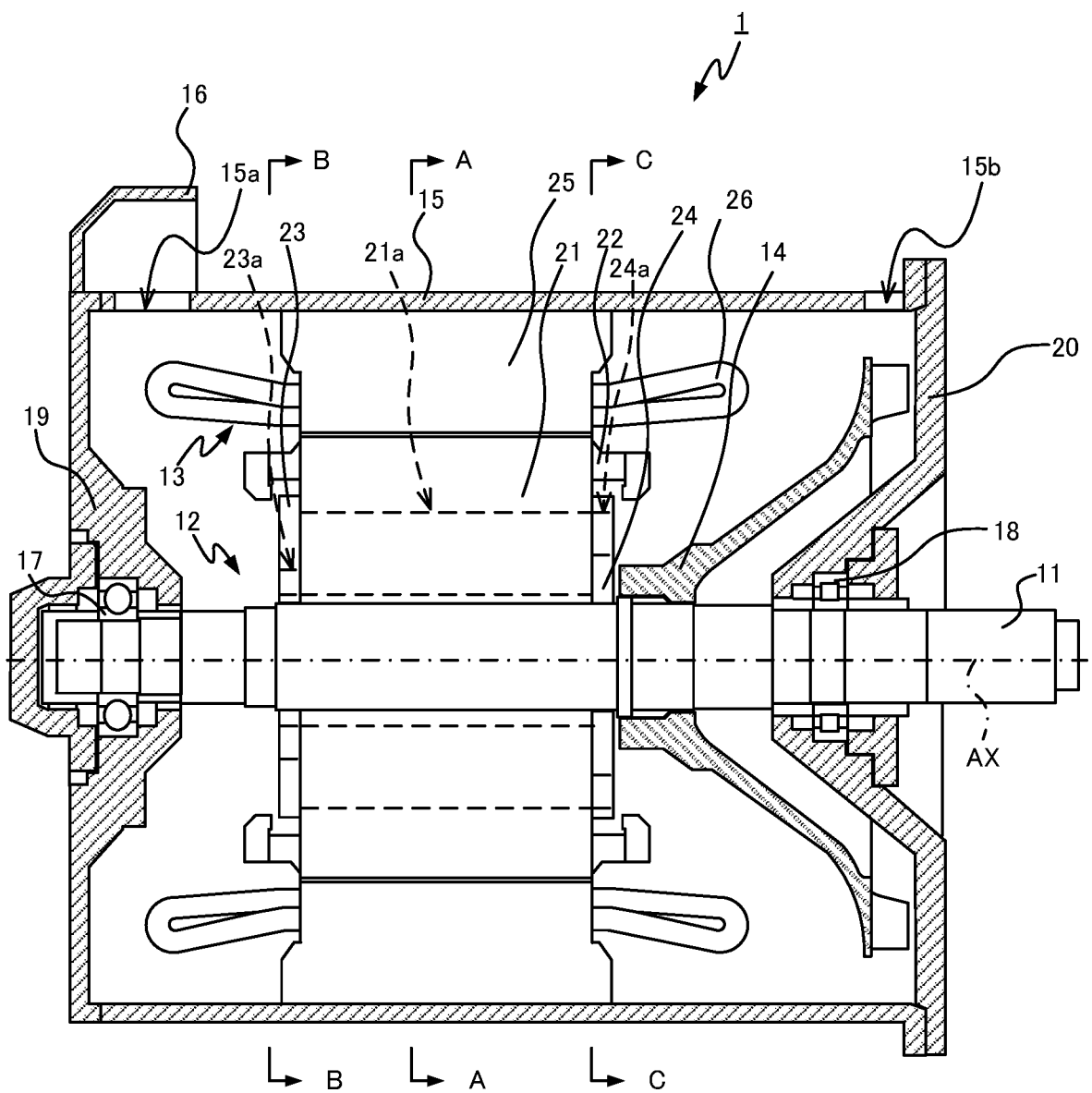
FIG. 1 is a cross-sectional view of an electric motor according to Embodiment 1.

An electric motor according to embodiments of the present disclosure is described in detail below with reference to the accompanying drawings. In the drawings, the components identical or corresponding to each other are provided with the same reference symbol.

Embodiment 1

An electric motor 1 according to Embodiment 1 is described below with reference to FIGS. 1 to 6, focusing on an exemplary open-type self-cooled electric motor for driving a railway vehicle. The open-type self-cooled electric motor introduces air from the outside into the electric motor by means of rotation of a fan and thus cools components of the electric motor. In FIGS. 1 to 6, the Z axis corresponds to the vertical direction, the Y axis is parallel to a rotation axis AX of a shaft 11 of the electric motor 1, and the X axis is orthogonal to the Y and Z axes. FIG. 1 illustrates the rotation axis AX with a dashed and single-dotted line. The air entering the electric motor 1 flows through first through holes 23a of a first retaining member 23, air passages 21a of a rotor core 21 included in a rotor 12, and second through holes 24a of a second retaining member 24 in sequence and then exits the electric motor 1. This air flow inside the rotor 12 cools the rotor 12, which is a component of the electric motor 1. The second through holes 24a of the second retaining member 24 are located radially outward from the first through holes 23a of the first retaining member 23. This arrangement facilitates air to enter the air passages 21a, leading to high cooling efficiency.

The electric motor 1 illustrated in FIG. 1 includes the shaft 11 supported rotatably around the rotation axis AX, the rotor 12 located radially outward from the shaft 11 and rotatable integrally with the shaft 11, a stator 13 radially opposing the rotor 12, a fan 14 rotatable integrally with the shaft 11, and the first retaining member 23 and the second retaining member 24 to hold the rotor 12 therebetween in the extending direction of the rotation axis AX.

The electric motor 1 further includes a frame 15 to accommodate the shaft 11, the rotor 12, the stator 13, the fan 14, the first retaining member 23, and the second retaining member 24. The frame 15 includes, in a vertically upper portion thereof, an inlet hole 15a at one end in the Y-axis direction to introduce air from the outside, and an outlet hole 15b at the other end in the Y-axis direction to discharge the introduced air. The electric motor 1 also includes a cover 16 to prevent contaminants, such as dust and water drops, from entering the electric motor 1 via the inlet hole 15a. The electric motor 1 further includes bearings 17 and 18 to support the shaft 11 rotatably, a first bracket 19 to hold the bearing 17, and a second bracket 20 to hold the bearing 18.

The individual components of the electric motor 1 are described in more detail below.

The end of the shaft 11 adjacent to the second bracket 20 is coupled to an axle of the railway vehicle via a joint and gears, which are not illustrated. The rotation of the shaft 11 provides power to the railway vehicle.

The rotor 12 includes the rotor core 21 fixed to the shaft 11, and rotor conductors 22 disposed in a groove on the outer peripheral surface of the rotor core 21. Since the rotor core 21 is fixed to the shaft 11, the rotor 12 including the rotor core 21 and the rotor conductor 22 rotates integrally with the shaft 11.

Figure 2:
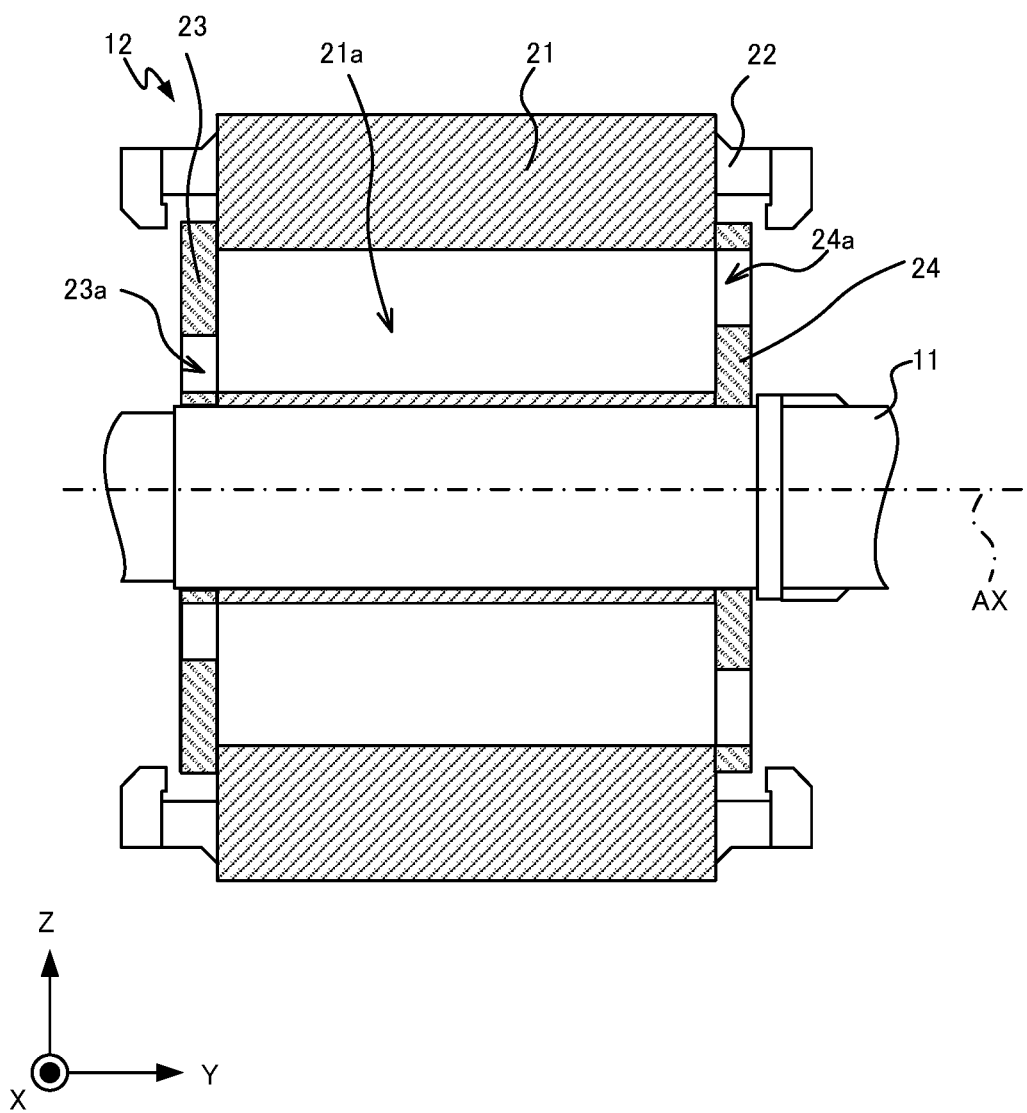
FIG. 2 is a partial cross-sectional view of the electric motor according to Embodiment 1.
Figure 3:
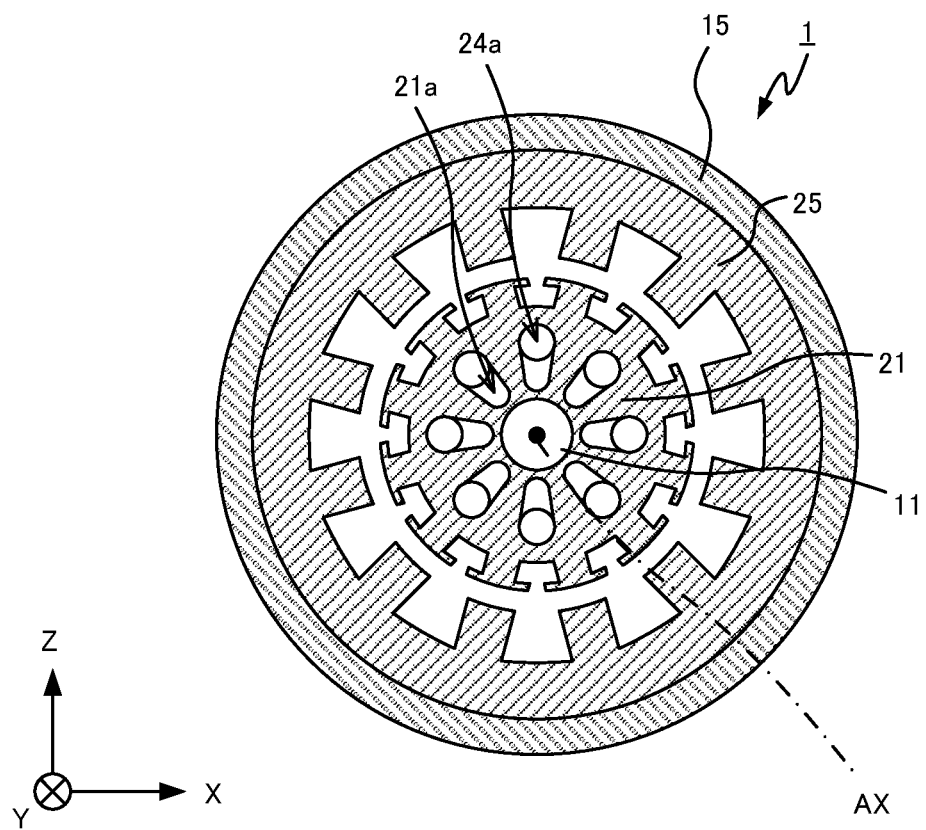
FIG. 3 is a cross-sectional view of the electric motor according to Embodiment 1 taken along the line A-A of FIG. 1.

The rotor core 21 is a stack of thin plates, which are arranged in the extending direction of the rotation axis AX and include through holes having the identical shape. In detail, the rotor core 21 is a stack of thin silicon steel plates, which are arranged in the extending direction of the rotation axis AX and include through holes having the identical shape. As illustrated in FIG. 1 and FIG. 2, which is a partial enlarged view of FIG. 1, the rotor core 21 made of such a stack includes the air passages 21a extending through the rotor core 21 in the extending direction of the rotation axis AX. In Embodiment 1, the ends of the air passages 21a that face the first retaining member 23 correspond to the upstream ends, and the ends of the air passages 21a that face the second retaining member 24 correspond to the downstream ends. Each of the air passages 21a has cross sections orthogonal to the penetration direction that have a constant shape from the upstream end to the downstream end. As illustrated in FIG. 3, which is a cross-sectional view taken along the line A-A of FIG. 1, the cross section of the air passage 21a orthogonal to the penetration direction preferably has a shape defined by connecting, with straight lines, the outer edges of a first circle and a second circle located radially outward from the first circle and having a larger diameter than that of the first circle. The major axis of the shape defined by connecting, with straight lines, the outer edges of the first circle and the second circle preferably radially extends. The sizes of the first circle and the second circle can be determined depending on a required cooling capacity of the electric motor 1 and a required strength of the rotor core 21 to receive torque.

As illustrated in FIG. 2, the air passages 21a are in communication with both of the first through holes 23a of the first retaining member 23 and the second through holes 24a of the second retaining member 24. The air passages 21a preferably have a radial length larger than that of the first through holes 23a. The air passages 21a preferably have a radial length larger than that of the second through holes 24a.

As illustrated in FIG. 1, the stator 13 includes a stator core 25 fixed to the frame 15, and stator conductors 26 disposed in a groove on the stator core 25. The stator core 25 radially opposes the rotor core 21 to define a space therebetween.

The fan 14 is fixed to the shaft 11 at a position adjacent to the second retaining member 24 and rotates integrally with the shaft 11. In Embodiment 1, the fan 14 is fixed to the shaft 11 such that the main surface faces the second bracket 20.

The frame 15 has a hollow cylindrical shape. The openings of the frame 15 at both ends in the extending direction of the rotation axis AX are closed by the first bracket 19 and the second bracket 20. The frame 15 includes, in vertically upper portions of the outer peripheral surface, the inlet hole 15a to introduce air from the outside, and the outlet hole 15b to discharge the air introduced via the inlet hole 15a and flowing through the air passages 21a.

The cover 16 is disposed over the inlet hole 15a of the frame 15.

The bearings 17 and 18 support the shaft 11 such that the shaft 11 is rotatable.

The first bracket 19 holds the bearing 17 and closes the opening of the hollow cylindrical frame 15 at one end.

The second bracket 20 holds the bearing 18 and closes the opening of the hollow cylindrical frame 15 at the other end.

Figure 4:
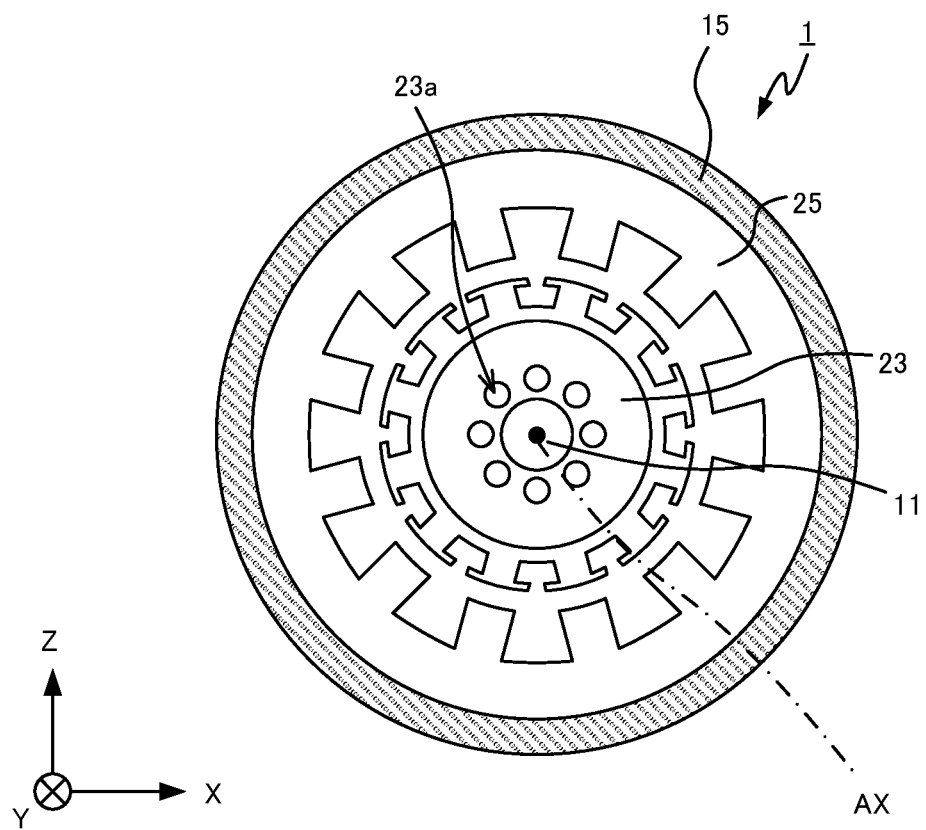
FIG. 4 is a cross-sectional view of the electric motor according to Embodiment 1 taken along the line B-B of FIG. 1.
Figure 5:
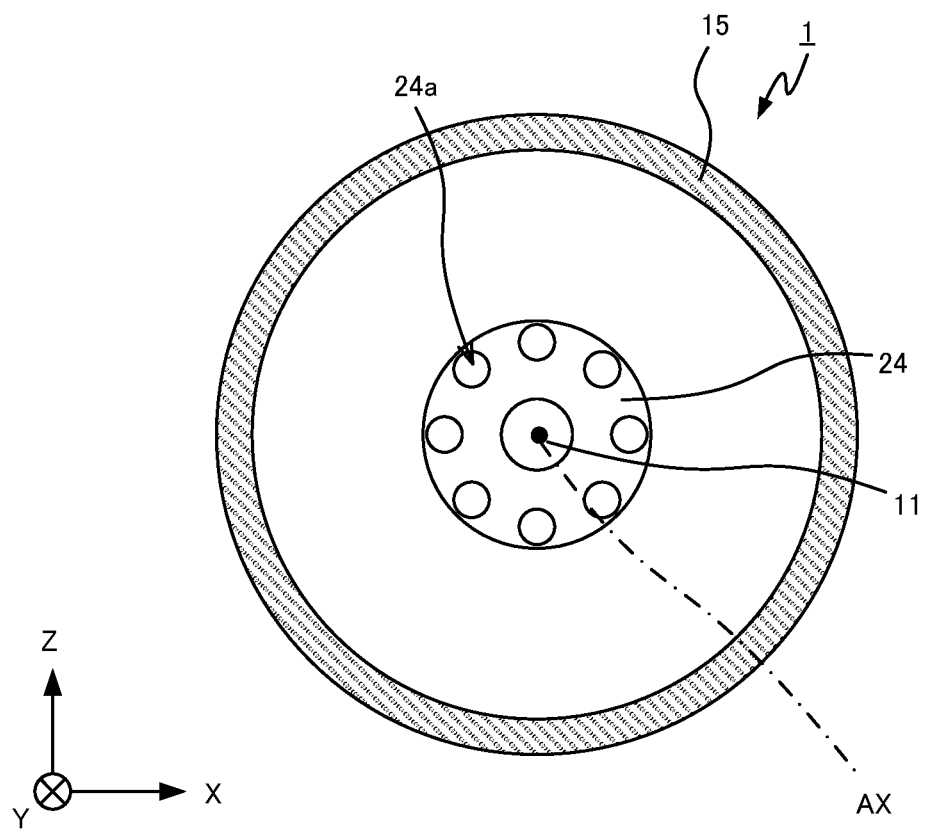
FIG. 5 is a cross-sectional view of the electric motor according to Embodiment 1 taken along the line C-C of FIG. 1.

The first retaining member 23 and the second retaining member 24 hold the rotor core 21 therebetween in the extending direction of the rotation axis AX. The first retaining member 23 and the second retaining member 24 are fixed to the rotor core 21 and rotate integrally with the rotor core 21. As illustrated in FIG. 1 and FIG. 4, which is a cross-sectional view taken along the line B-B of FIG. 1, the first retaining member 23 includes the first through holes 23a in communication with the upstream ends of the air passages 21a of the rotor core 21. As illustrated in FIG. 1 and FIG. 5, which is a cross-sectional view taken along the line C-C of FIG. 1, the second retaining member 24 includes the second through holes 24a in communication with the downstream ends of the air passages 21a of the rotor core 21. The radially outermost portion of the wall of each of the first through holes 23a is located radially inward from the radially outermost portion of the wall of each of the second through holes 24a.

In the above-described example in which the cross sections of the air passages 21a orthogonal to the penetration direction have a shape defined by connecting, with straight lines, the outer edges of the first circle and the second circle located radially outward from the first circle and having a larger diameter than that of the first circle, the first through holes 23a preferably have cross sections orthogonal to the penetration direction having the shape identical to that of the first circle. In this case, the radially inner walls of the first through holes 23a smoothly continue to the radially inner walls of the air passages 21a.

In the above-described example in which the cross sections of the air passages 21a orthogonal to the penetration direction have a shape defined by connecting, with straight lines, the outer edges of the first circle and the second circle located radially outward from the first circle and having a larger diameter than that of the first circle, the second through holes 24a preferably have cross sections orthogonal to the penetration direction having the shape identical to that of the second circle. In this case, the radially outer walls of the second through holes 24a smoothly continue to the radially outer walls of the air passages 21a.

Figure 6:
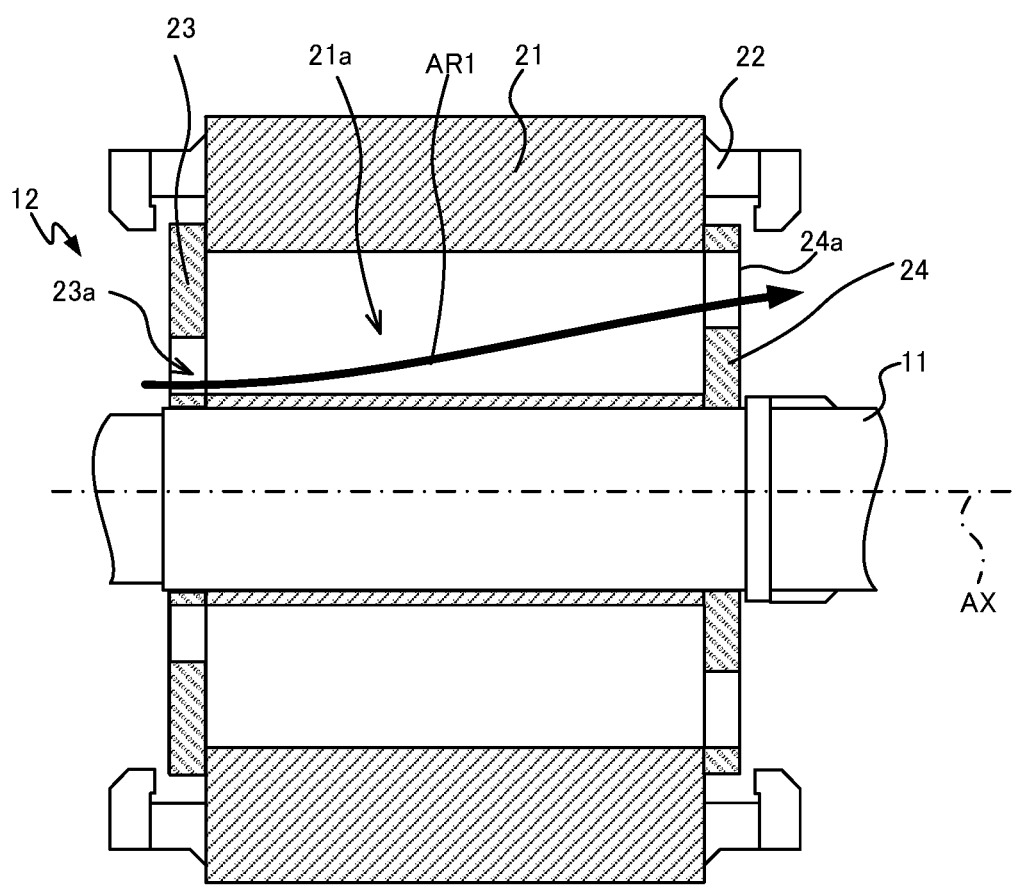
FIG. 6 illustrates a flow of air inside a rotor included in the electric motor according to Embodiment 1.

When the electric motor 1 having the above-described configuration is energized and causes the rotor core 21 and the shaft 11 to rotate integrally with each other, the fan 14 rotates along with the shaft 11, so that air outside the electric motor 1 enters the electric motor 1 via the inlet hole 15a illustrated in FIG. 1. The air introduced via the inlet hole 15a then arrives at the first through holes 23a. FIG. 6 illustrates a flow of air through the first retaining member 23, the rotor core 21, and the second retaining member 24 with an arrow AR1. As illustrated with the arrow AR1, the air arriving at the first through holes 23a flows through the first through holes 23a, the air passages 21a, and then the second through holes 24a. The air flowing through the second through holes 24a exits the electric motor 1 via the outlet hole 15b illustrated in FIG. 1. The above-described air flows inside the electric motor 1 cool the electric motor 1.

As described above, the first through holes 23a are located radially inward from the second through holes 24a in the electric motor 1 according to Embodiment 1. Accordingly, the air at the first through holes 23a has a static pressure higher than that of the air at the second through holes 24a during rotation of the rotor 12. This configuration facilitates the air to flow through the first through holes 23a, the air passages 21a, and the second through holes 24a, thereby improving the cooling efficiency. The electric motor 1, of which the rotor core 21 is made of a stack of thin plates including through holes having the identical shape, can be fabricated by a simple process.

In the case where the cross sections of the air passage 21a orthogonal to the penetration direction have a shape defined by connecting, with straight lines, the outer edges of the first circle and the second circle located radially outward from the first circle and having a larger diameter than that of the first circle, a larger amount of air can be sent to portions of the air passages 21a adjacent to the rotor conductor 22 that emits heat, leading to more efficient cooling of the electric motor 1.

Embodiment 2

The air passages 21a, the first through holes 23a, and the second through holes 24a may have any shape other than that of the above-described example, provided that the air introduced via the inlet hole 15a is guided to the outlet hole 15b. The description of Embodiment 2 is directed to an electric motor 2 including air passages 21b and second through holes 24b having different shapes from those in Embodiment 1.

Figure 7:
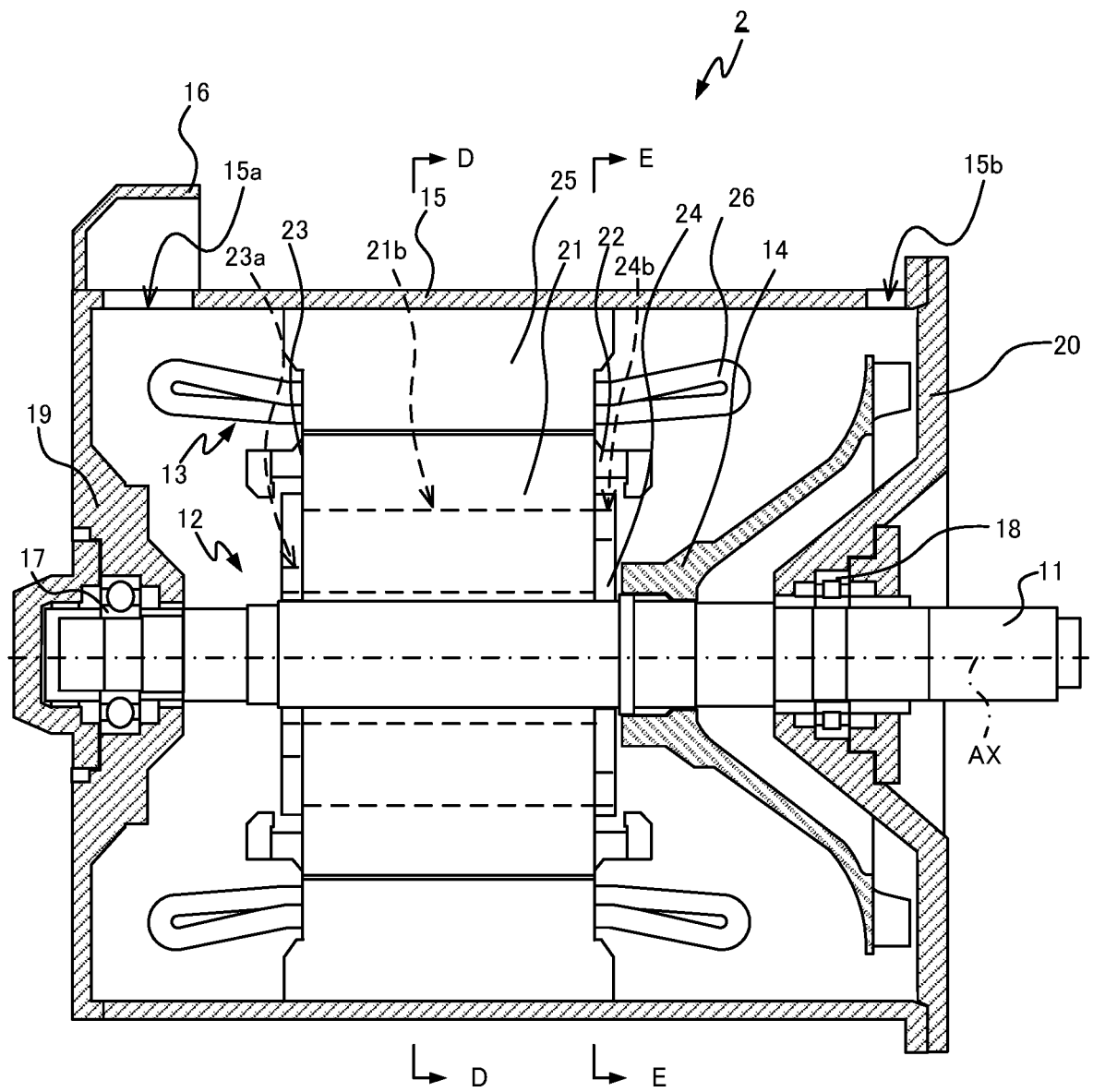
FIG. 7 is a cross-sectional view of an electric motor according to Embodiment 2.
Figure 7:
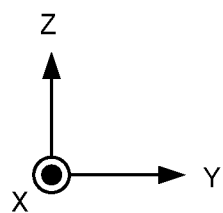
Figure 8:
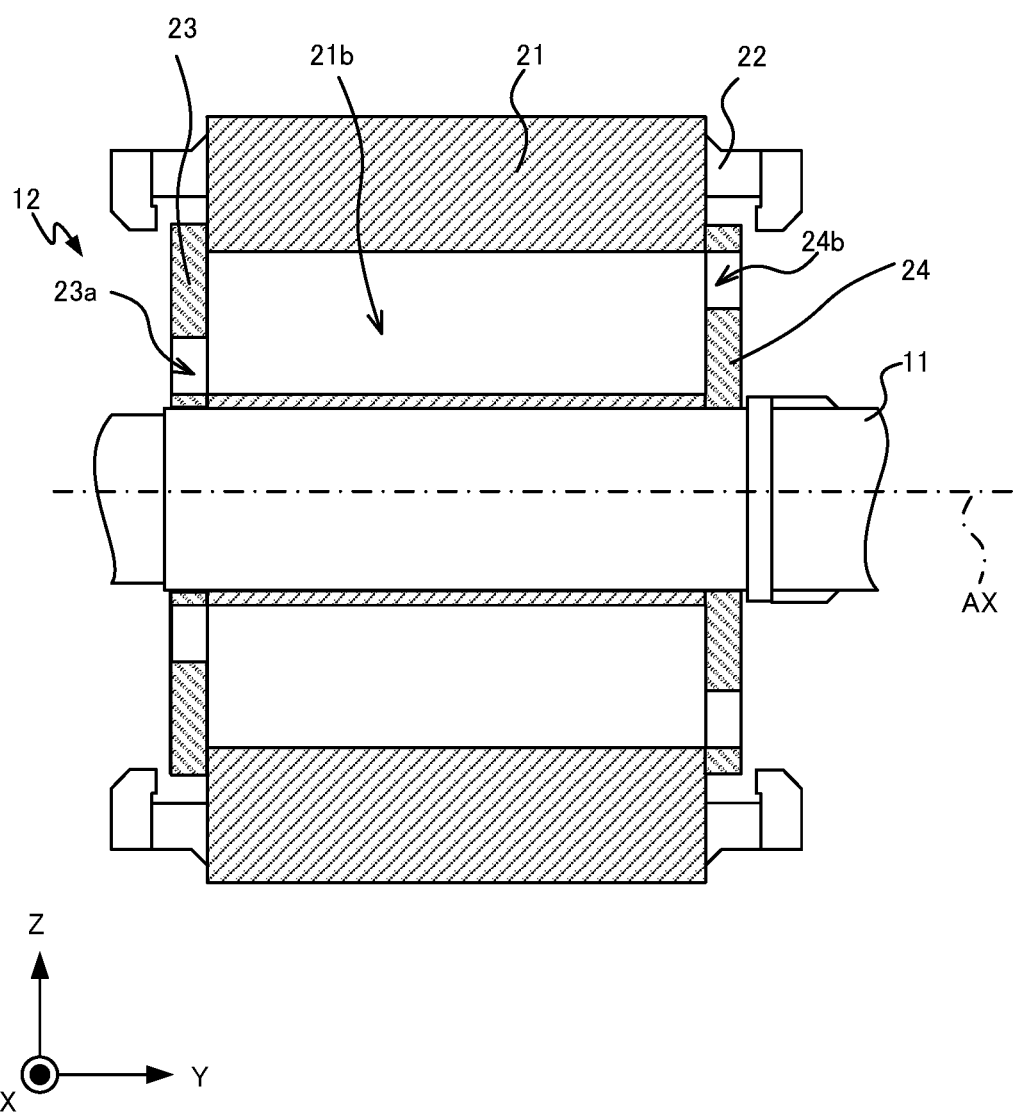
FIG. 8 is a partial cross-sectional view of the electric motor according to Embodiment 2.
Figure 9:
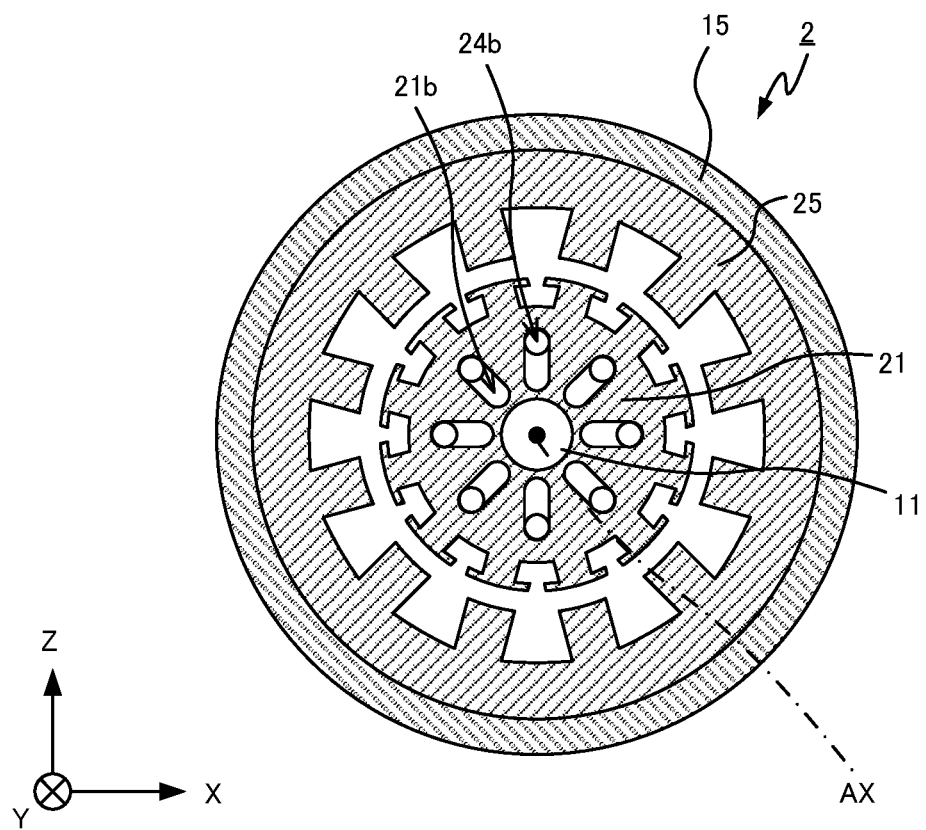
FIG. 9 is a cross-sectional view of the electric motor according to Embodiment 2 taken along the line D-D of FIG. 7.

The structure of the electric motor 2 illustrated in FIG. 7 is generally identical to that in Embodiment 1. The rotor core 21 of the electric motor 2 includes the air passages 21b extending through the rotor core 21, as illustrated in FIG. 8, which is a partial enlarged view of FIG. 7. In Embodiment 2, the ends of the air passages 21b that face the first retaining member 23 correspond to the upstream ends, and the ends of the air passages 21b that face the second retaining member 24 correspond to the downstream ends. The upstream ends of the air passages 21b are in communication with the first through holes 23a of the first retaining member 23. The downstream ends of the air passages 21b are in communication with the second through holes 24b of the second retaining member 24. Each of the air passages 21b has cross sections orthogonal to the penetration direction that have a constant shape from the upstream end to the downstream end. As illustrated in FIG. 9, which is a cross-sectional view taken along the line D-D of FIG. 7, the cross section of the air passage 21b orthogonal to the penetration direction has a shape defined by connecting, with straight lines, the outer edges of a first circle and a second circle located radially outward from the first circle and having the same diameter as that of the first circle.

Figure 10:
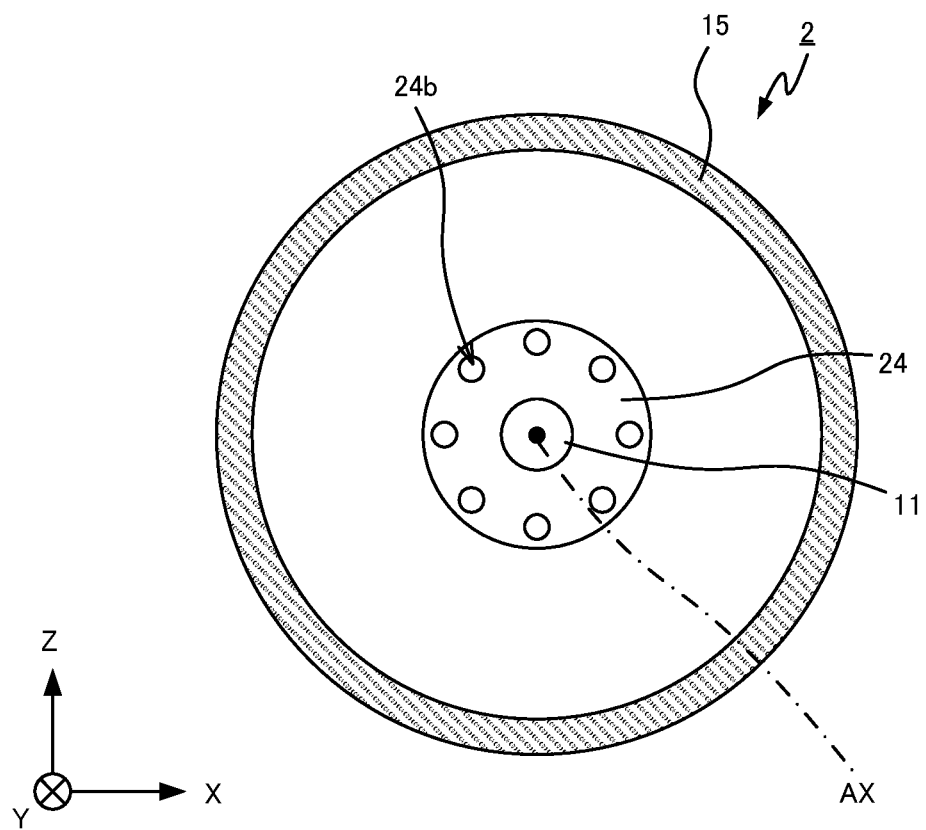
FIG. 10 is a cross-sectional view of the electric motor according to Embodiment 2 taken along the line E-E of FIG. 7.

As illustrated in FIG. 8 and FIG. 10, which is a cross-sectional view taken along the line E-E of FIG. 7, the second retaining member 24 includes the second through holes 24b in communication with the downstream ends of the air passages 21a of the rotor core 21. The radially outermost portion of the wall of each of the first through holes 23a is located radially inward from the radially outermost portion of the wall of each of the second through holes 24b, as in Embodiment 1. The second through holes 24b have cross sections orthogonal to the penetration direction having the same shape as that of the above-mentioned second circle. The radially outer walls of the second through holes 24b smoothly continue to the radially outer walls of the air passages 21b.

Figure 11:
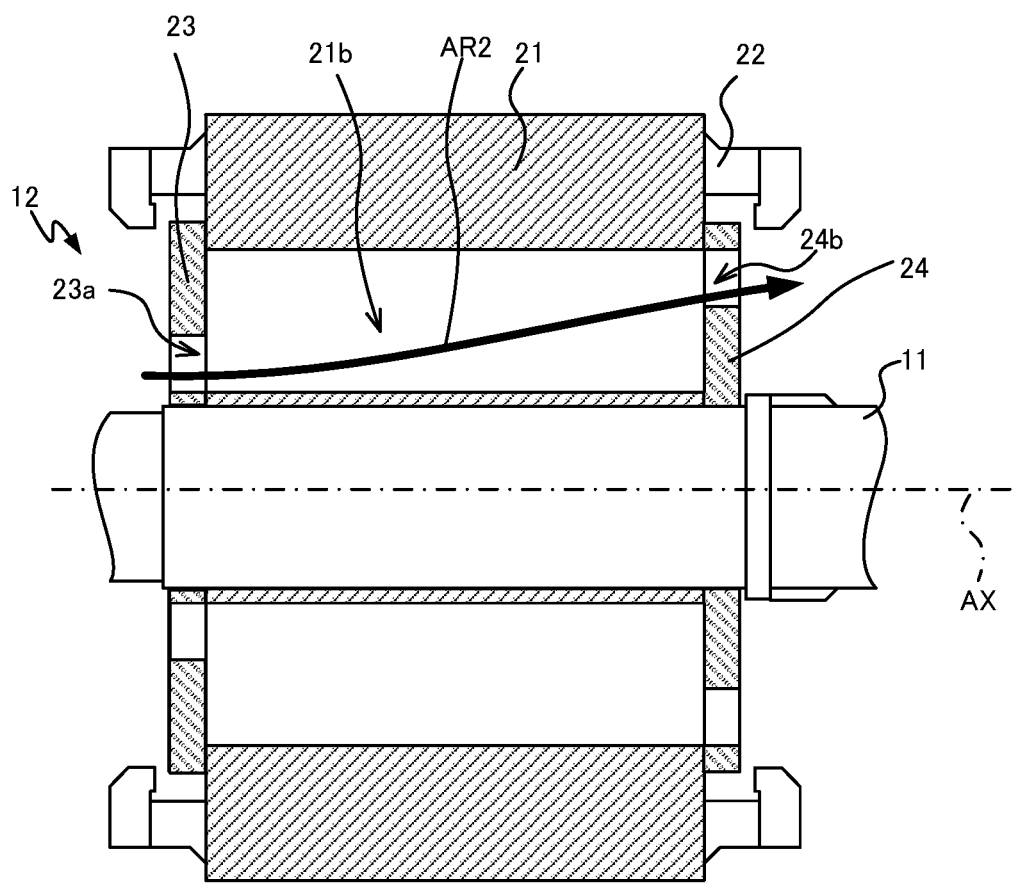
FIG. 11 illustrates a flow of air inside a rotor included in the electric motor according to Embodiment 2.

When the electric motor 2 is energized and causes the rotor core 21 and the shaft 11 to rotate integrally with each other, the fan 14 rotates along with the shaft 11, so that the air outside the electric motor 2 enters the electric motor 2 via the inlet hole 15a illustrated in FIG. 7. The air entering via the inlet hole 15a then arrives at the first through holes 23a. FIG. 11 illustrates a flow of air through the first retaining member 23, the rotor core 21, and the second retaining member 24 with an arrow AR2. As illustrated with the arrow AR2, the air arriving at the first through hole 23a flows through the first through hole 23a, the air passage 21b, and then the second through hole 24b. The air flowing through the second through hole 24b exits the electric motor 2 via the outlet hole 15b illustrated in FIG. 7. The above-described air flows inside the electric motor 2 cool the electric motor 2.

As described above, the first through holes 23a are located radially inward from the second through holes 24b in the electric motor 2 according to Embodiment 2. Accordingly, the air at the first through holes 23a has a static pressure higher than that of the air at the second through holes 24b during rotation of the rotor 12. This configuration facilitates the air to flow through the first through holes 23a, the air passages 21b, and the second through holes 24b, thereby improving the cooling efficiency. The electric motor 2, of which the rotor core 21 is made of a stack of thin plates including through holes having the identical shape, can be fabricated by a simple process.

The above-described embodiments are not to be construed as limiting the present disclosure.

Figure 12:
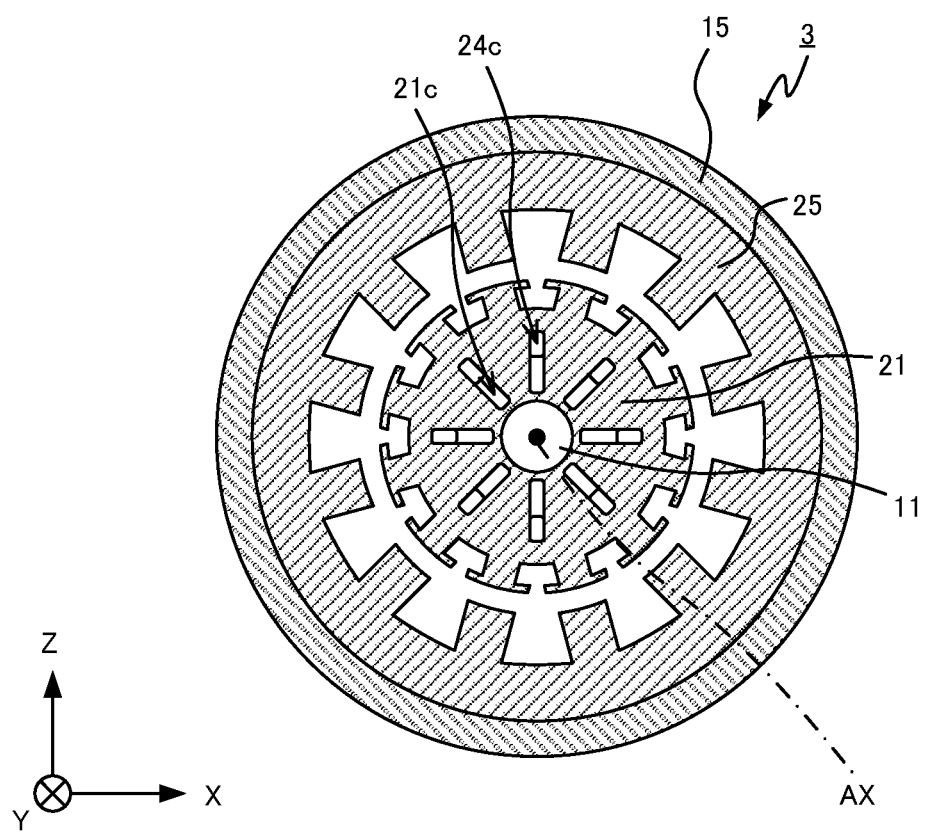
FIG. 12 is a cross-sectional view of an electric motor according to a first modification of the embodiments.

Provided that the rotor core 21 is a stack of thin plates including through holes having the identical shape, these through holes may have any shape. For example, an electric motor 3 may include the rotor core 21 made of a stack of thin plates including through holes having a rectangular shape with rounded corners. In detail, air passages 21c illustrated in FIG. 12 have cross sections orthogonal to the penetration direction having a rectangular shape with rounded corners. For another example, the air passages 21a, 21b, and 21c may have cross sections orthogonal to the penetration direction having a wing or elliptical shape.

The number and positions of the air passages 21a, 21b, and 21c are not necessarily the number and positions in the above-described examples, and can be appropriately determined depending on parameters, such as a required cooling capacity of the electric motors 1 to 3 and a required strength of the rotor core 21 to receive torque.

Figure 13:
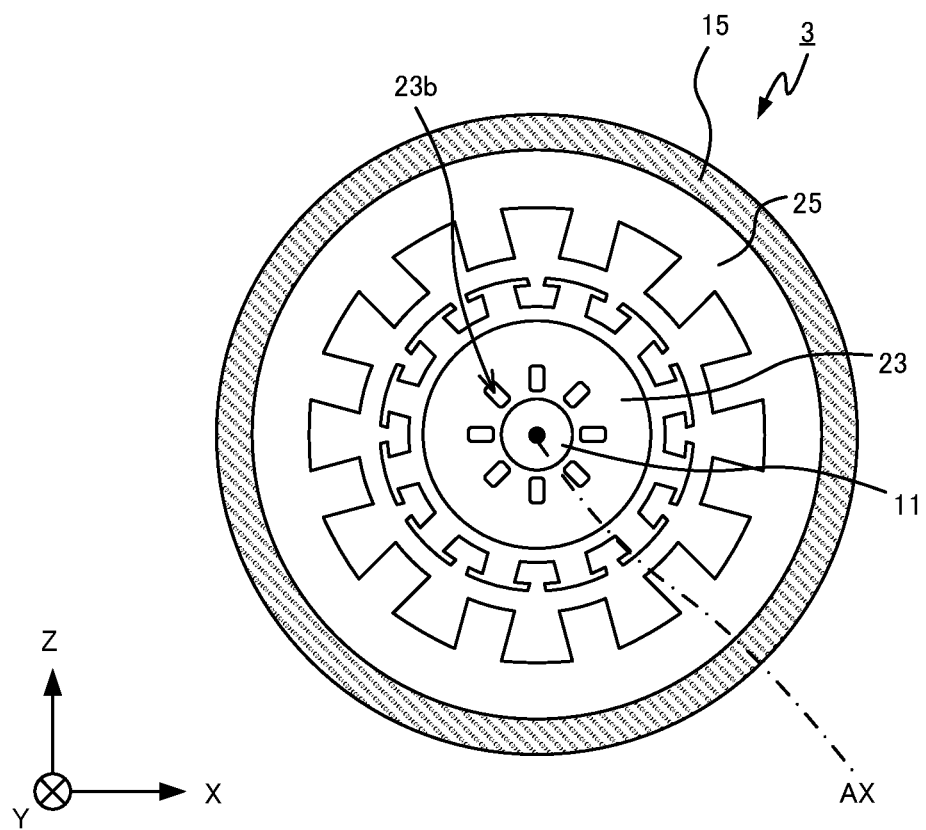
FIG. 13 is another cross-sectional view of the electric motor according to the first modification of the embodiments.

The cross sections of the first through holes 23a orthogonal to the penetration direction may have any shape, provided that the first through holes 23a are located radially inward from the second through holes 24a or 24b and able to guide the air introduced via the inlet hole 15a to the air passages 21a or 21b. For example, the first retaining member 23 of the electric motor 3 may include first through holes 23b illustrated in FIG. 13. These first through holes 23b have cross sections orthogonal to the penetration direction having a rectangular shape with rounded corners. For another example, the first through holes 23a and 23b may have cross sections orthogonal to the penetration direction having a wing or elliptical shape.

The first through holes 23a and 23b may have a circumferential width larger than that of the air passages 21a and 21b. The penetration direction of first through holes 23a and 23b is not limited to the extending direction of the rotation axis AX.

Figure 14:
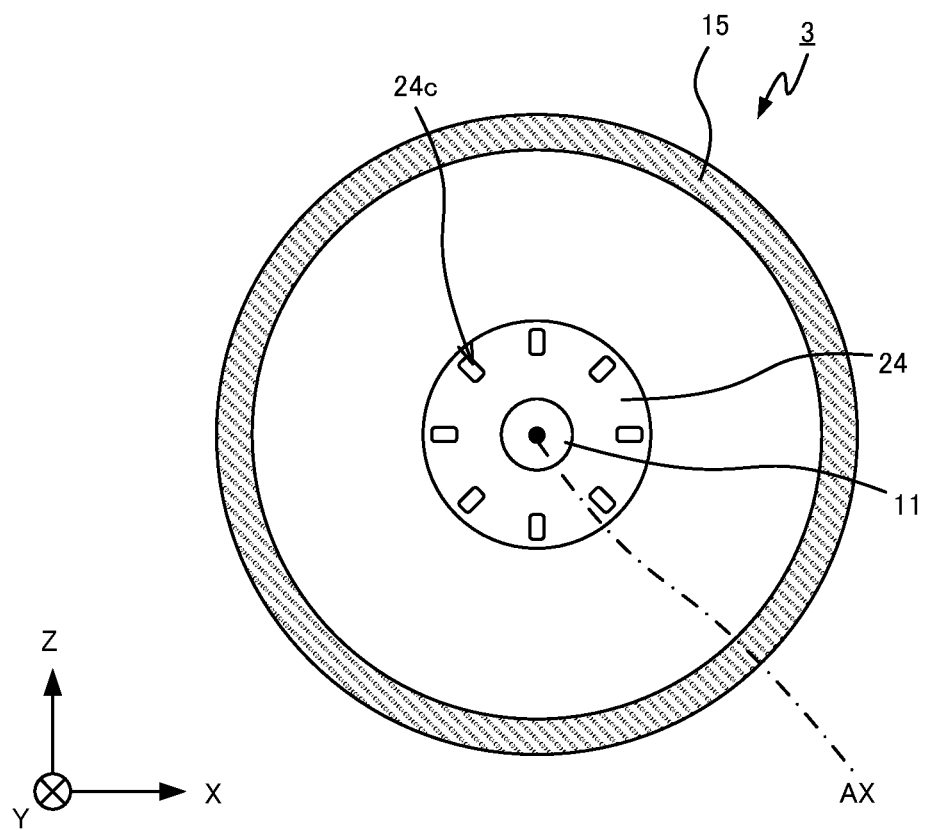
FIG. 14 is a cross-sectional view of an electric motor according to a second modification of the embodiments.

The cross sections of the second through holes 24a and 24b orthogonal to the penetration direction may have any shape, provided that the second through holes 24a or 24b are located radially outward from the first through holes 23a or 23b and able to discharge the air flowing from the air passages 21a, 21b, or 21c. For example, the second retaining member 24 of the electric motor 3 may include second through holes 24c illustrated in FIG. 14. These second through holes 24c have cross sections orthogonal to the penetration direction having a rectangular shape with rounded corners. For another example, the second through holes 24a, 24b, and 24c may have cross sections orthogonal to the penetration direction having a wing or elliptical shape.

The second through holes 24a, 24b, and 24c may have a circumferential width larger than that of the air passages 21a, 21b, and 21c. The second through holes 24a, 24b, and 24c may have the same radial length as that of the air passages 21a, 21b, and 21c. The second through holes 24a, 24b, and 24c may extend in a direction other than the extending direction of the rotation axis AX.

The first retaining member 23 and the rotor core 21 may be provided with an end plate therebetween. In this case, the end plate between the first retaining member 23 and the rotor core 21 includes through holes having the same shape as that of the air passages 21a, 21b, or 21c. Also, the second retaining member 24 and the rotor core 21 may be provided with an end plate therebetween. In this case, the end plate between the second retaining member 24 and the rotor core 21 includes through holes having the same shape as that of the air passages 21a, 21b, or 21c.

Figure 15:
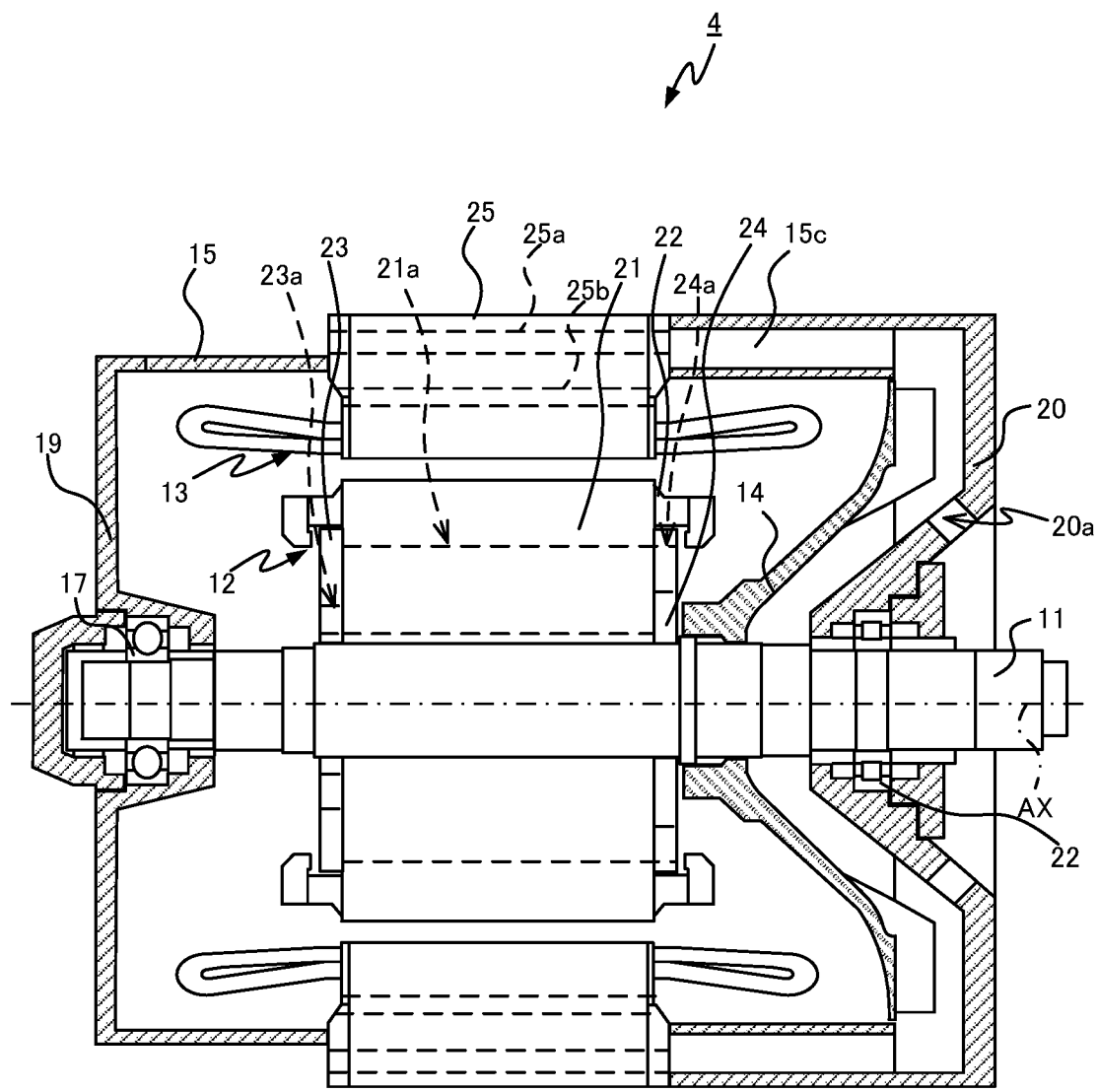
FIG. 15 is a cross-sectional view of an electric motor according to a third modification of the embodiments.

The present disclosure can also be applied to a closed-type electric motor other than the open-type self-cooled electric motor. FIG. 15 illustrates a closed-type electric motor 4. As in the electric motor 1 according to Embodiment 1, the rotor core 21 includes the air passages 21a, the first retaining member 23 includes the first through holes 23a, and the second retaining member 24 includes the second through holes 24a. Unlike Embodiment 1, the frame 15 of the electric motor 4 includes air passages 15c, the second bracket 20 includes inlet holes 20a, and the stator core 25 includes outer air passages 25a and inner air passages 25b. The inner air passages 25b are located radially inward from the outer air passages 25a.

When the electric motor 4 is energized, the rotation of the fan 14 causes air to enter the electric motor 4 via the inlet holes 20a. The air entering the electric motor 4 flows through the air passages 15c and the outer air passages 25a and then exits the electric motor 4. Inside the electric motor 4, the air arriving at the inner air passages 25b by means of rotation of the fan 14 flows through the inner air passages 25b and then arrives at the first through holes 23a. The air arriving at the first through holes 23a flows through the first through holes 23a, the air passages 21a, and then the second through holes 24a, as in Embodiment 1. The air flowing through the second through holes 24a arrives at the inner air passages 25b again and circulates as described above. The flows of air involving entering the electric motor 4, flowing through the stator core 25, and exiting the electric motor 4 and the circulation of the air inside the electric motor 4 cool components of the electric motor 4.

Figure 16:
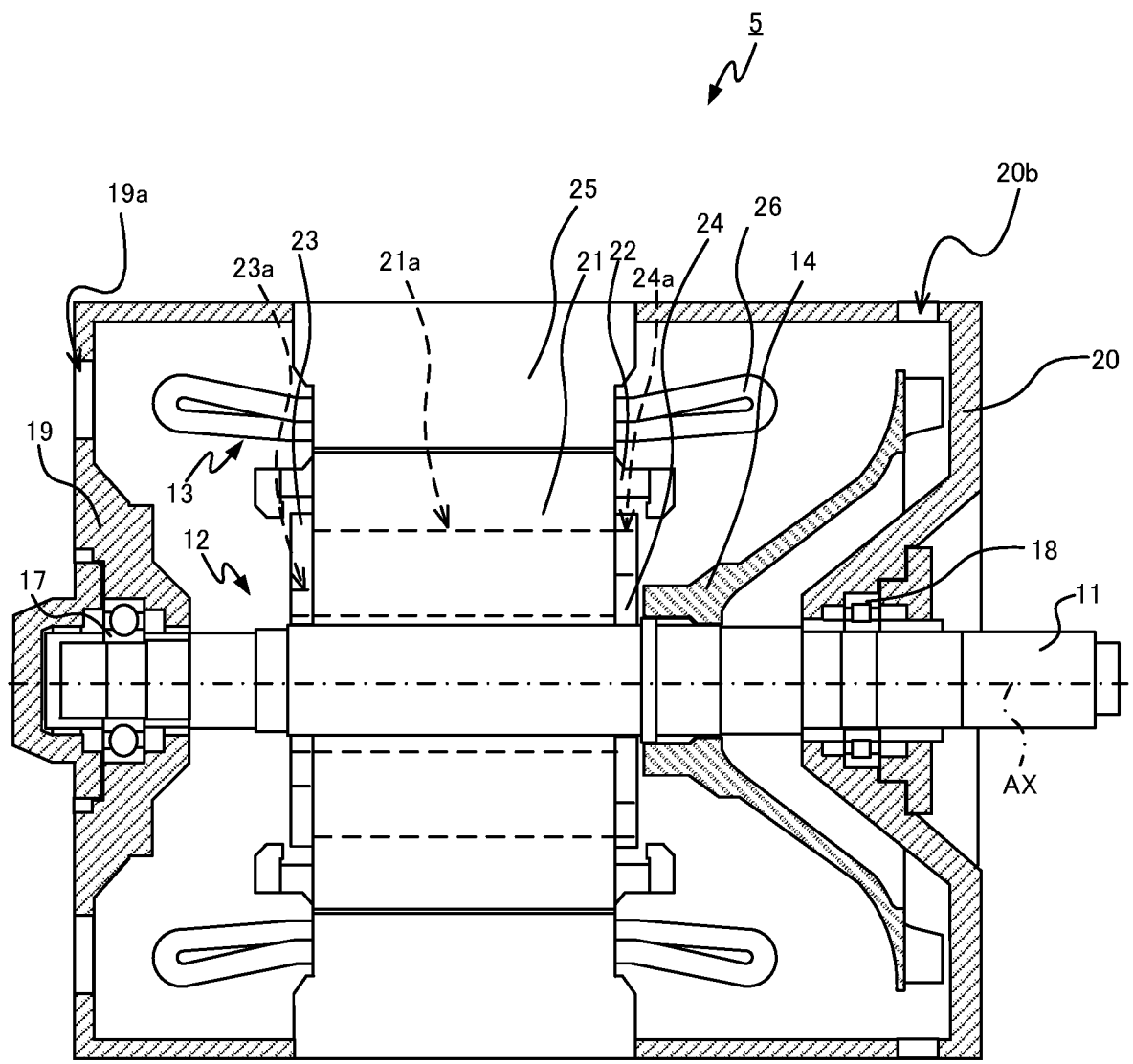
FIG. 16 is a cross-sectional view of an electric motor according to a fourth modification of the embodiments.

The present disclosure can also be applied to a frameless electric motor. An electric motor 5 illustrated in FIG. 16 lacks the frame 15, unlike the electric motors 1 to 4. The first bracket 19 of the electric motor 5 includes inlet holes 19a to introduce air from the outside, and the second bracket 20 includes outlet holes 20b to discharge the air. As in the electric motor 1 according to Embodiment 1, in the electric motor 5, the rotor core 21 includes the air passages 21a, the first retaining member 23 includes the first through holes 23a, and the second retaining member 24 includes the second through holes 24a.

When the electric motor 5 is energized, the rotation of the fan 14 causes air to enter the electric motor 5 via the inlet holes 19a. The air entering the electric motor 5 arrives at the first through holes 23a. The air arriving at the first through holes 23a flows through the first through holes 23a, the air passages 21a, and then the second through holes 24a, as in Embodiment 1. The air flowing through the second through holes 24a exits the electric motor 5 via the outlet holes 20b. The air entering the electric motor 5 and flowing inside the rotor 12 cools components of the electric motor 5.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3, 4, 5 Electric motor
11 Shaft
12 Rotor
13 Stator
14 Fan
15 Frame
15a, 19a, 20a Inlet hole
15b, 20b Outlet hole
15c Air passage
16 Cover
17, 18 Bearing
19 First bracket
20 Second bracket
21 Rotor core
21a, 21b, 21c Air passage
22 Rotor conductor
23 First retaining member
23a, 23b First through hole
24 Second retaining member
24a, 24b, 24c Second through hole
25 Stator core
25a Outer air passage
25b Inner air passage
26 Stator conductor
AR1, AR2 Arrow
AX Rotation axis

The invention claimed is:

1. An electric motor comprising:
a shaft supported rotatably around a rotation axis;
a rotor located radially outward from the shaft and rotatable integrally with the shaft;
a stator radially opposing the rotor to define a space therebetween; and
a first retaining member and a second retaining member to hold the rotor therebetween in an extending direction of the rotation axis, wherein
the rotor comprises a stack of thin plates arranged in the extending direction of the rotation axis and having a mutually-identical shape, the thin plates each including a through hole having an identical shape,
the through hole of the individual thin plate included in the stack defines an air passage extending through the rotor in the extending direction of the rotation axis,
the first retaining member includes a first through hole in communication with an upstream end of the air passage,
the second retaining member includes a second through hole in communication with a downstream end of the air passage,
a radially outermost portion of a wall of the first through hole is located radially inward from a radially innermost portion of a wall of the second through hole,
the second through hole is located radially outward from the first through hole,
a cross section of the air passage orthogonal to a penetration direction has a shape defined by connecting, with straight lines, outer edges of a first semicircle and a second semicircle, the second semicircle being located radially outward from the first semicircle,
a major axis of the shape defined by connecting, with straight lines, the outer edges of the first semicircle and the second semicircle extends radially,
a cross section of the first through hole orthogonal to a penetration direction has a shape overlapping a shape of the first semicircle,
a radially inner wall of the first through hole smoothly continues to a radially inner wall of the air passage,
a cross section of the second through hole orthogonal to a penetration direction has a shape overlapping a shape of the second semicircle, and
a radially outer wall of the second through hole smoothly continues to a radially outer wall of the air passage.

2. The electric motor according to claim 1, wherein a radial length of the air passage is longer than a radial length of the first through hole.

3. The electric motor according to claim 2, wherein a radial length of the air passage is longer than a radial length of the second through hole.

4. The electric motor according to claim 1, wherein a radial length of the air passage is longer than a radial length of the second through hole.

5. The electric motor according to claim 1, wherein a diameter of the second semicircle is larger than a diameter of the first semicircle.

6. The electric motor according to claim 1, further comprising a fan fixed to the shaft at a position adjacent to the second retaining member and rotatable integrally with the shaft.

7. The electric motor according to claim 1, further comprising a frame to accommodate the shaft, the rotor, the stator, the first retaining member, and the second retaining member, wherein
the frame includes:
an inlet hole to introduce air from an outside; and
an outlet hole to discharge the air to the outside, the air being introduced via the inlet hole and flowing through the first through hole, the air passage, and the second through hole.

8. The electric motor according to claim 1, further comprising a pair of brackets to hold the stator therebetween in the extending direction of the rotation axis and accommodate the shaft, the rotor, the first retaining member, and the second retaining member.

9. The electric motor according to claim 8, wherein
one of the pair of brackets includes an inlet hole to introduce air from an outside, and
the other of the pair of brackets includes an outlet hole to discharge the air to the outside, the air being introduced via the inlet hole and flowing through the first through hole, the air passage, and the second through hole.

* * * * *